Patented May 21, 1929.

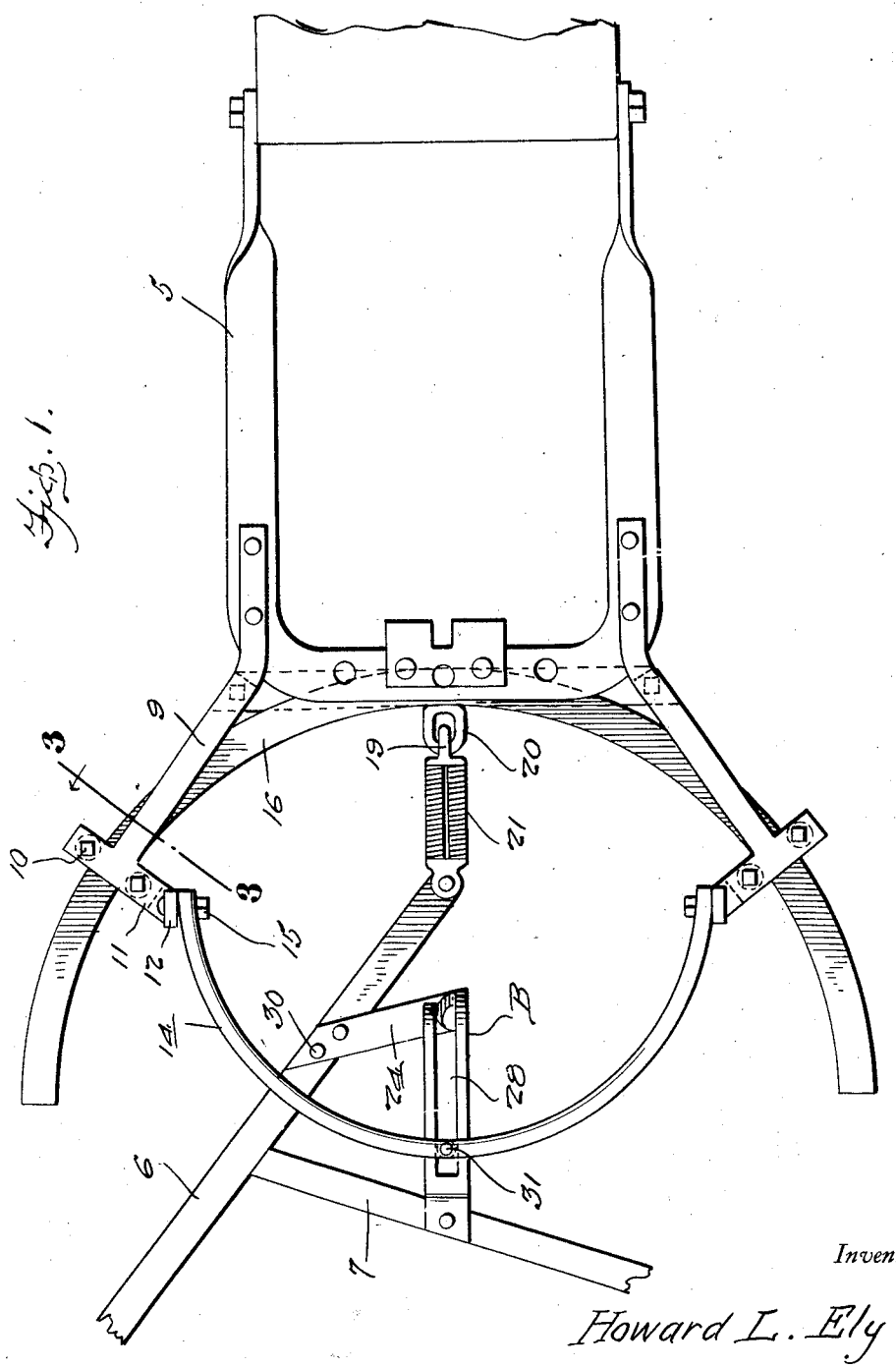

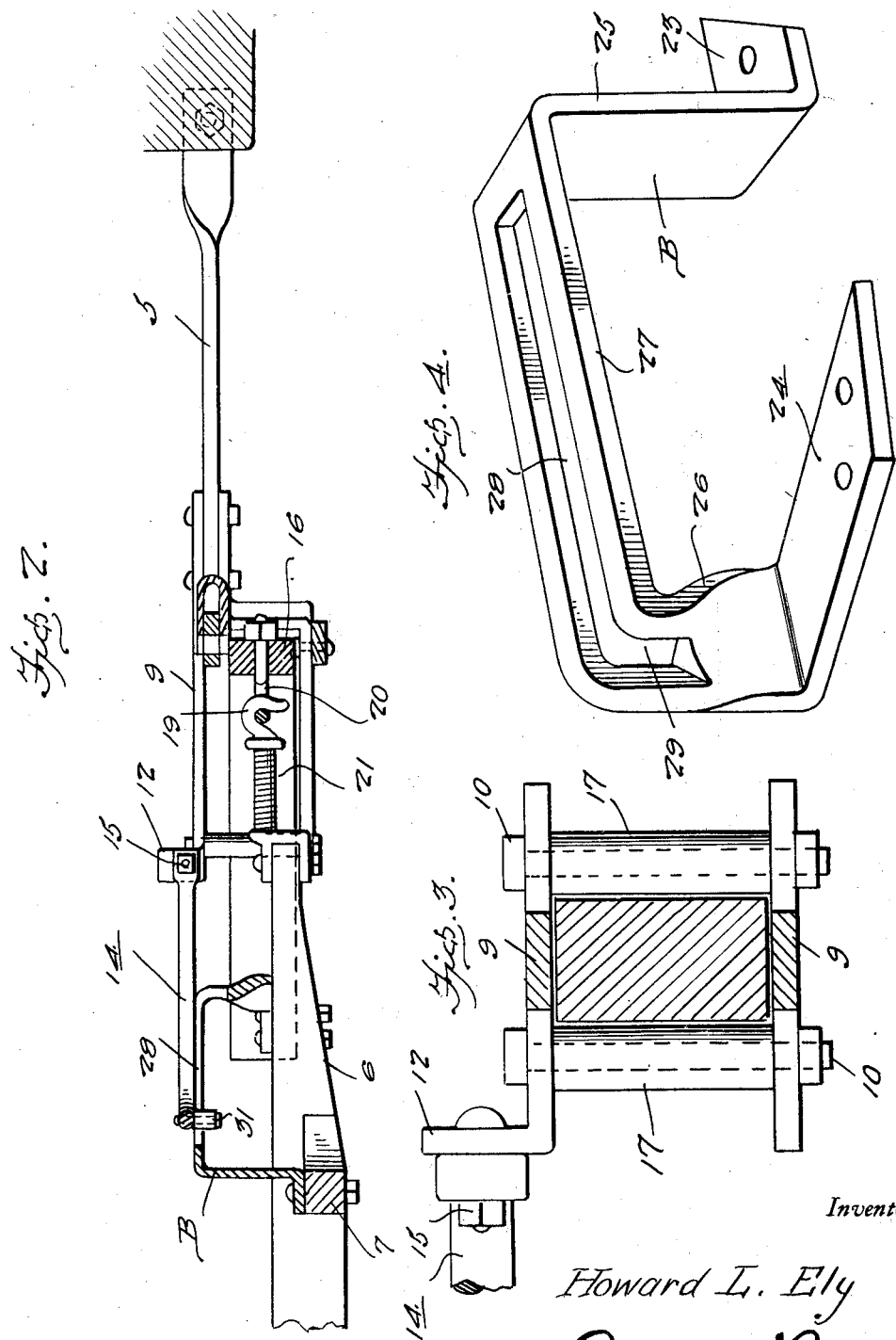

UNITED STATES PATENT OFFICE.

HOWARD L. ELY, OF SIDNEY, OHIO.

PLOW DRAFT CONNECTION.

Application filed October 31, 1927. Serial No. 229,975.

The present invention relates to means for pulling a plow by a tractor and has for its prime object to provide a structure which will cause the plow to follow the path of the tractor at the turn.

A still further important object of the invention resides in the provision of a mechanism of this nature which is simple in its construction, strong and durable, compact and convenient in its arrangement of parts, thoroughly efficient and reliable in use and operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:—

Figure 1 is a top plan view of the device embodying the features of my invention, Figure 2 is a vertical longitudinal section therethrough, Figure 3 is an enlarged detail section substantially on the line 3—3 of Figure 1, and Figure 4 is a perspective view of a slide-way bracket forming part of the device.

Referring to the drawing in detail it will be seen that the numeral 5 denotes a U-shaped draw bar forming part of the tractor equipment extending rearwardly therefrom in the usual well known manner. Numeral 6 denotes one bar of a plow mechanism, numeral 7 another bar thereof. All the parts thus far described are conventional and have been illustrated merely to exemplify one of the useful ways in which the present invention may be employed.

From each rear corner of the U-shaped draw bar 5 there projects rearwardly and to the side a pair of arms 9 in horizontal parallel spaced relation, the rear ends being connected by bolts 10. The upper arm 9 has an inwardly directed extension 11, the terminal of which is bent upwardly as at 12 and an arcuate bale 14 has its ends pivoted to the terminals 12 by bolts 15 or in any other desirable manner. An arcuate bar, substantially semi-circular is denoted by the numeral 16 and is slidable between each pair of arms 9 and between the bolts 10, said bolts 10 having between the arms 9 anti-friction sleeves 17 rotatable thereon. A rearwardly projecting eye 19 is provided at the center of the concaved side of the arcuate bar 16 to be engaged by the hook 20 of a hitch spring 21 which is engaged on the forward extremity of the plow bar 6. The bar 7 supports the slide-way bracket B shown to advantage in Figure 4. This slide-way bracket comprises ears 23 and 24 from which rise legs 25 and 26 respectively and merge into an elongated bite portion 27 which is provided with a longitudinally extending slot 28 merging into an extension slot 29 provided in the upper portion of the leg 26. The leg 26 is twisted so that the ear 24 which is longer than the ear 23 extends at an angle thereto. The ear 24 is bolted on an intermediate portion of the forward part of the bar 6, as indicated at 30 while the ear 23 is bolted to an intermediate portion of the bar 7. A pin 31 projects from the center of the arcuate bale 14 for movement in the slot 28, the extension 29 being provided so that if the hitch formed at 19, 20 becomes unhooked the pin may move out of the slot 28.

The pivotal connection of the bale 14 at 15 accommodates the unevenness in the ground and the slot 28 accommodates the play between the plow and the tractor occasioned by the spring pull 21. As the tractor turns the draw bar will move about the arcuate bar 16, the pin 31 being in the approximate center of the curvature of this bar 16 and will cause the plow to follow the tractor in the same path.

It is thought that the construction, operation, utility and advantages of this invention will now be quite apparent to those skilled in this art without a more detailed description thereof. The present embodiment of the invention has been disclosed in detail merely by way of example since in actual practice it attains the features of advantage enumerated as desirable in the statement of the invention and the above description. It will be apparent that changes in the details of construction, in the sizes and in the combination and arrangement of parts may be resorted to without departing from the spirit or scope of the invention as hereinafter claimed or sacrificing any of its advantages.

Having thus described my invention, what I claim as new is:

1. A device of the class described comprising two pairs of arms, means for attaching the arms to the draw bar so that the pairs will extend rearwardly and outwardly therefrom, a pair of bolts connecting the rear ends of each pair of arms, an arcuate bar movable between the arms and the bolts, and means for engaging a plow with the center of the arcuate bar.

2. A device of the class described comprising two pairs of arms, means for attaching the arms to the draw bar so that the pairs will extend rearwardly and outwardly therefrom, a pair of bolts connecting the rear ends of each pair of arms, an arcuate bar movable between the arms and the bolts, an arcuate bale, means for pivoting the ends of the bale to the rear extremities of pairs of arms, a slot way bracket adapted to be mounted on a plow with its slot way extending longitudinally and a pin on the center of said bale projecting into said slot way.

3. A device of the class described comprising two pairs of arms, means for attaching the arms to the draw bar so that the pairs will extend rearwardly and outwardly therefrom, a pair of bolts connecting the rear ends of each pair of arms, an arcuate bar movable between the arms and the bolts, an arcuate bale, means for pivoting the ends of the bale to the rear extremities of pairs of arms, a slot way bracket adapted to be mounted on a plow with its slot way extending longitudinally and a pin on the center of said bale projecting into said slot way, and resilient connecting means to connect the plow with the center of the arcuate bar.

In testimony whereof I affix my signature.

HOWARD L. ELY.